United States Patent Office 3,823,117
Patented July 9, 1974

3,823,117
TRIBENZYLAMINE MOIETY CONTAINING
POLYESTERS
Volker Freudenberger, Diedenbergen, and Franz Jakob, Hofheim, Taunus, Germany, assignors to Farbwerke Hoechst Aktiengesellschaft vormals Meister Lucius & Bruning, Frankfurt am Main, Germany
No Drawing. Filed Oct. 6, 1972, Ser. No. 295,665
Claims priority, application Germany, Oct. 8, 1971, P 21 50 293.2
Int. Cl. C08g 17/08, 17/14
U.S. Cl. 260—75 N                    6 Claims

ABSTRACT OF THE DISCLOSURE

Modified, synthetic linear fiber and film-forming polyesters with improved colorability for acid dyes are prepared by adding during the manufacture of fiber and film-forming linear polyesters from the usual raw materials tertiary amino compounds of the formula

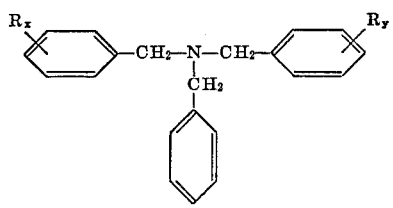

wherein
R=the free or esterified carboxyl group,
$x+y=1$ or 2 and $x$ as well as $y$ can be 0 or 1 or—in the case of $x+y=2$—likewise the value 2,
and at least 3 carbon atoms are situated between each R group and the $CH_2$-group, which connects the ring carrying R with the tertiary N, as well as between the R groups, if $x$ or $y=2$.

The polyesters contain about 50–500, preferably about 100–300 mequiv. of basic N.

The fibers and filaments made from the modified polyesters possess a very good degree of whiteness and have very good dying properties for acid dyes and good dying properties for dispersion dyes.

The present invention relates to the preparation of modified, synthetic, linear fiber and film-forming polyesters with improved colorability for acid dyes and so the fibers and filaments made of this polyesters.

It is known that the usual synthetic, linear fiber and film-forming polyesters, above all those of terephthalic acid, such as polyethylene terephthalate, polytetramethylene terephthalate and their copolyesters, provided that they do not contain any modification agents with special functional groups, can be dyed practically only with dispersion dyes. Therefore many experiments have been made to make these polyesters accessible to dyeing with cheaper, ionic dyes by corresponding modifications. On the one hand, attempts have been made to modify the polyesters in such a way that they are easily colorable with basic dyes, on the other hand attempts were made also to prepare polyesters with modifying agents containing basic nitrogen, which then possess an increased affinity to acid dyes. In these latter attempts mainly tertiary amines—primary and secondary are not suitable on account of their thermal stability being too low and their tendency to undergo or to favor undesired side-reactions—or nitrogen-containing heterocyclic compounds have been used. These basic compounds were either incorporated in the polyester chain molecules by functional groups capable of forming esters, or dissolved only physically in the polyester.

The type of polyester modifying agent mentioned first is for example described in the German Offenlegungsschrift 1,964,654 and in U.S. Pat. 2,739,958; the amines incorporated in the polyester chain molecules are at the same time glycol components, i.e. in the polyesters partially glycols are incorporated, which contain basic nitrogen. The modification of polyesters which contain the basic nitrogen in the carboxylic acid components is known for example, from U.S. Pats. 2,891,929 and 3,065,207. All these modifying agents, including the N-alkyl- and -cycloalkyl-dibenzyl amines carrying carboxylic groups, disclosed in the last patent mentioned, are not very suitable, however, for polyester modification, and the reasons are mainly the following: the amines used in the processes mentioned have the disadvantage that they show only a relatively small thermostability and decompose at the high temperatures which are necessary for the preparation of polyesters, which causes more or less strong colorations of the polyesters. Furthermore, additional colorations often occur subsequently with these polyesters through the effect of light, which can probably be attributed to photo-oxidative damages of the amine compounds incorporated into the polyester chains.

Disadvantages can also scarcely be avoided when the basic nitrogen is incorporated by means of polyamides, which contain tertiary amine groups and are added to the polyesters in molten condition (German Offenlegungsschrift No. 1,545,013). If the polyamides containing tertiary amine groups are considered as modifying amine compounds this method comes into the group of polyesters modified by physical solution of basic amine compounds.

The purely physical mixing of tertiary amines, for example of tribenzyl amine, which show no groups capable of forming esters, into polyesters is known from German Auslegeschrift No. 1,494,630. An advantage here is that the amine can be mixed with the finished polyester and therefore is only subjected to higher temperatures for a short time during the melt spinning. In this process the homogenous distribution of the additives in the finished fiber, which is necessary for uniform dyeing, can only be brought about with difficulty. A further disadvantage is that the modifying amine is not bound chemically, which means that it can be diffused to the fiber surface and washed out.

It is the object of the present invention to prepare fiber and film-forming linear polyesters, which are easily colorable with acid dyes, and which do not have the above disadvantages.

The process of the invention complies with this requirement, It provides a process for the preparation of modified, synthetic, linear fiber and film-forming polyesters having improved colorability for acid dyes, from the raw materials usual for the preparation of fiber and film-forming linear polyesters by esterification or transesterification and polycondensation in the presence of usual catalysts and tertiary amine compounds which comprises using tertiary amine compounds of the formula

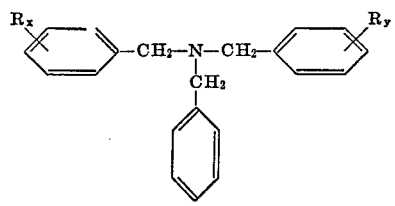
(I)

in which
R=the free or esterified carboxyl group,
$x+y=1$ or 2 and $x$ as well as $y$ can be 0 or 1 or—in the case of $x+y=2$—likewise the value 2,
and at least 3 carbon atoms are situated between the R groups and the CH₂-group which connects the ring carrying R with the tertiary N, as well as between the R groups, if x or y=2. The tertiary amine compounds are added in an amount such that the finished polyester contains about 50 to 500, preferably about 100 to 300 mequiv. of basic nitrogen (capable of being titrated) per kilogram.

A further object of the invention is the production of; fibers and filaments obtained by the above process and characterized by a content of chain members of the formula

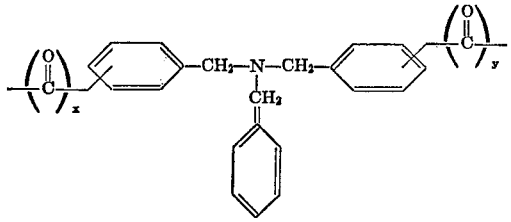

(I')

in which x and y have the same meaning as in formula (I) and at least 3 carbon atoms are situated between the CO- and CH₂-groups which combine the ring carrying the CO group with the tertiary N-atom, as well as between the CO-groups if x or y is 2.

In comparison to the known polyesters modified with nitrogen compounds the polyesters obtained according to the invention and the corresponding fibers and filaments show, surprisingly, distinctly less discolorations and therefore a considerably better degree of whiteness. The polyesters can be processed according to the usual processes without difficulties to fibers and filaments, which are colorable with acid dyes in deep shades and furthermore show an increased affinity to dispersion dyes.

The tribenzyl amine derivatives used in the invention as modifying agents possess at least one, preferably, however, two carboxyl functions bound at an aromatic nucleus. In the case of two carboxyl functions these can be bound on the same aromatic ring as well as on two different rings. If the polyester is prepared from free dicarboxyl acids and diols, modifying compounds with free carboxyl groups are also used; in the case of the polyester preparation from dicarboxylic acid esters such as dimethyl terephthalate and diols also the carboxyl groups of the modifying compounds should be esterified preferably with lower aliphatic alcohols such as methanol, ethanol, n- or i-propanol or with a butanol. Between the carboxyl functions and the CH₂-group, which connects the ring, carrying the respective carboxyl function, with the tertiary N, at least 3 carbon atoms should be situated. Likewise, if the two carboxyl functions are on the same aromatic ring, they should not be in ortho-position. Thus, the following compounds corresponding to formula I can be used, for the sake of simplicity only, compounds with free carboxyl groups being indicated.

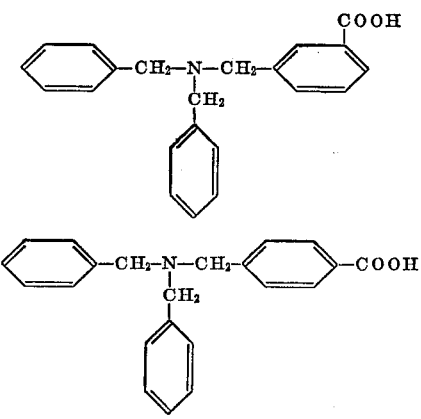

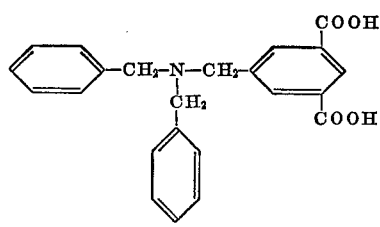

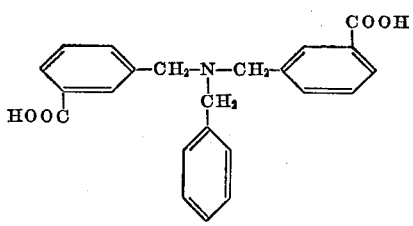

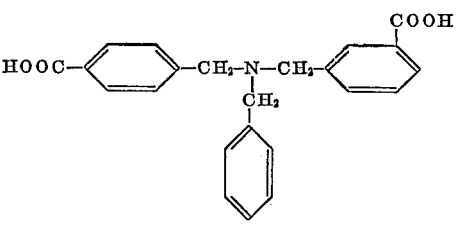

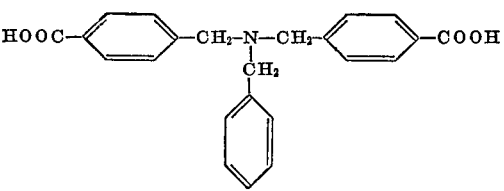

Also tribenzyl amine derivatives with other positions of the carboxyl functions and with substituents which are reaction-inert such as Cl, F or OCH₃ can be used optionally in small quantity. The amines are incorporated in the polyester chains by the carboxyl functions. As they are used as monomers, the amines are incorporated statistically so that an even distribution of the amine nitrogen in the polyesters is guaranteed. Since amines with only one carboxyl function can be bound at the end of the polyester chains only their use is less favoured; on account of the chain breaking effect of these amines it is then expedient to add cross-linking agents such as trimellitic acid or trimethylol propane to increase the molecular weight. The amines of formula I are thermally very stable; the N-[3,5-dicarbomethoxy]-benzyl-dibenzyl-amine can be distilled for example at 240° C./ 0.8 mm. Hg without decomposition. Therefore it is possible to prepare modified polyesters with these amines, which are practically not colored. A discoloration does not occur either through the effect of light over a long period.

The preparation of the tribenzyl amine derivatives used according to the invention is carried out by conversion of corresponding benzyl halides with benzyl amines according to the methods used for such reactions.

When carrying out the process according to the invention the same reaction conditions are applied as for the preparation of the corresponding unmodified fiber- and film-forming linear polyesters. Dicarboxylic acids or their lower (preferably C₁ to C₄-) alkyl esters such as terephthalic acid or dimethyl terephthalate with diols such as ethylene glycol or tetramethylene glycol are reacted by direct esterification or transesterification and the product obtained is polycondensed in the known way. For the direct or trans-esterification and the polycondensation the known catalysts such as, for example, p-toluene-sulfonic acid (direct esterificaiton), manganese acetate, zinc acetate (transesterification), $Sb_2O_3$ (polycondensation), or titanium acid esters (transesterification and polycondensation) are used. The tribenzyl amine derivatives of the formula I can be added practically at any time during the polyester preparation, thus in the transesterification or esterification stage or during the polycondensation. The terephthalic acid used preferably for the process according to the invention as dicarboxylic acid, or its lower alkyl esters, can partly, i.e. especially up to about 10 to 20 mol percent, be replaced by other aromatic, aliphatic, or cyclo-aliphatic dicarboxylic acids or hydroxy-carboxylic acids. As such acids are listed for example: isophthalic acid, diphenylsulfone-4,4'-dicarboxylic acid, adipic acid, sebacic acid, 1,4-cyclohexanedicarboxylic acid, p-hydroxybenzoic acid, or ε-hydroxy-caproic acid.

As diol components those of the formula

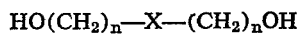

are especially of interest; in the formula X signifies $CH_2$, a homologous, unbranched or branched aliphatic or cycloaliphatic alkylene radical or an arylene radical or one of the hetero atoms O and S, n signifies zero or a whole number from 1 to 8, whereby the value 0 cannot stand when $X=CH_2$, O or S. Besides ethylene glycol and tetramethylene glycol already mentioned, propanediol-1,3 or 1,4-bis-hydroxymethylcyclohexane are of interest, for example, as diols. Furthermore, also ethylene oxide aromatic bisphenols or polyalkylene oxides may be used as diol components. The diols can be used alone or in combination with one another. The exclusive use of ethylene glycol or tetramethylene glycol is of course preferable, optionally mixed with up to about 20 percent of other diols.

Of course all the possible usual additives such as delusterants etc. can also be added in the process of the invention.

The modified polyesters obtained according to the invention are processed according to known methods into shaped articles such as fibers and filaments. It is also possible to spin the modified polyesters together with other polymers into bi-component fibers.

In the following examples the relative viscosities $\eta_{rel}$. of the products are determined with 1 weight percent solutions of the polyesters in phenol/tetrachloroethane 3:2 at 25° C. The yellow figures were measured with the photoelectric remission photometer Elrepho of Messrs. Zeiss against MgO as standard.

Examples 1–3 refer to the preparation of the modification substances used according to the invention.

EXAMPLE 1

Preparation of N-[3,5-dicarbomethoxy]-benzyl-dibenzylamine 201 g. of 5-bromo-methyl-isophthalic acid dimethyl ester are heated together with 414 g. of dibenzylamine while stirring at 100° C., whereby a clear solution is obtained, from which a thick paste develops after a short time by crystal separation. The temperature is then increased to 150° C. and kept at 150° C. for 30 minutes. The mixture is cooled, the reaction product is taken up in ether and separated from the undissolved matter. The ethereal solution is washed with 2n acetic acid, then with $NaHCO_3$-solution and finally with water. The residue remaining after drying and removing the ether is re-crystallized twice from ethanol/active carbon. 260 g. of N-[3,5-dicarbomethoxy]-benzyl-dibenzylamine are obtained having a melting point of 75–76° C., which is found to contain:

Calc.: C, 74.40; H, 6.25; N, 3.48. Found: C, 74.0; H, 6.3; N, 3.5.

EXAMPLE 2

Preparation of N,N-bis[(4-carbomethoxy)-benzyl]-benzylamine 92 g. of p-bromo-methyl-benzoic acid methyl ester and 21.5 g. of benzylamine are refluxed together with 25.5 g. of $Na_2CO_3$ in 150 ml. of ethanol for 15 hours. After this the reaction mixture is filtered while still hot. For further purification the reaction product is subjected to distillation, in which a fraction is separated at a temperature of between 205 and 265° C. (0.5 mm.), which is redistilled. 40.5 g. of N,N-bis[(4-carbomethoxy)-benzyl]-benzylamine having a boiling point under 1 mm. Hg of 270–277° C. are obtained, which shows the following composition:

Calc.: C, 74.4; H, 6.25; N, 3.48. Found: C, 74.1; H, 6.25; N, 3.3.

EXAMPLE 3

Preparation of N-[4-carbomethoxy]-benzyl-dibenzylamine 22.9 g. of p-bromo-methyl - benzoic acid methyl ester and 19.7 g. of dibenzylamine are refluxed together with 12.7 g. of $Na_2CO_3$ in 100 ml. of ethanol for 6 hours. The reaction mixture is filtered while still hot, the filter residue is washed with ethanol and ether and the filtrate is freed from the solvent. The viscous residue is distilled in the vacuum (0.1 mm.) whereby a fraction is obtained which boils at a temperature between 198° and 202° C. This fraction is taken up in ether, whereby a small portion, which is separated by filtration, remains undissolved. The ethereal solution is washed with 2n acetic acid, then with water. The residue remaining after drying and removing of the ether is distilled again. 20 g. of N-[4-carbomethoxy]-benzyldibenzyl-amine are obtained having a boiling point 0.1 of 198–202° C., which shows the following composition:

Calc.: C, 80.0; H, 6.7; N, 4.1. Found: C, 80.0; H, 6.8; N, 4.2.

The following Examples 4–8 refer to the preparation of the modified polyesters.

EXAMPLE 4

In a vessel provided with stirrer, column and reflux condenser 250 g. of dimethyl terephthalate, 217 g. of ethylene glycol, 15 g. of N-[3,5-dicarbomethoxy]-benzyl-dibenzylamine and 56 mg. of manganese acetate were heated for 2.5 hours at 180–210° C., until the methanol splitting-off ceased. To eliminate the excess glycol the product obtained was heated, after adding 25 mg. of $H_3PO_3$ and 76 mg. of $Sb_2O_3$, in a polycondensation vessel for 60 minutes at 250° C. Next the pressure was reduced within 90 minutes to 0.1 to 0.5 mm. of mercury at this temperature. The polycondensation taking place with separation of ethylene glycol was terminated by heating at 275° C. under a pressure of 0.1 to 0.5 mm. of mercury in the course of 90 minutes (polycondensation time). A practically colorless polycondensate was obtained, having a relative viscosity of 1.99, a second order transition temperature of 77° C., a crystallization temperature of 132° C., a melting point of 254° C. and a content of basic nitrogen of 119 mequiv./kg. polyester. The polyester obtained was dried for 8 hours at 180° C. under a pressure of 10 mm. of mercury and then spun on an extruder at a temperature of 285° C. through a spinneret having 12 orifices with a draw off rate of 1000 m./min. The filaments, drawn off in the usual manner with a draw ratio of 1:2.7, had the following properties:

Tensile strength _____ p./dtex__ 2.6
Elongation at break _____ percent__ 24.6
Yellow figure _____ 20.1

The filaments obtained could be dyed exactly as the filaments described in the following examples with acid dyes, such as for example those with the color index numbers 24 (acid black)
44 (acid yellow)
85 (acid red)
111 (acid blue)
141 (acid red)
154 (acid red)
163 (acid red) and
205 (acid blue)

and with metal complex dyes, such as for example those with the color index numbers:

59 (acid yellow)
199 (acid blue) and
278 (acid red)

at pH 1-5 under boiling or high temperature conditions with and without carrier in deep shades. The dyeings were fast to washing and to light.

EXAMPLE 5

In a vessel provided with stirrer, column and reflux condenser 1000 g. of dimethyl terephthalate, 1,020 g. of butanediol-1,4, 60 g. of N-[3,5-dicarbomethoxy]-benzyl-dibenzylamine and 44.5 mg. of isopropyl titanate were heated for 135 minutes at 150–190° C., until the methanol evolution had substantially ceased. After this the product obtained was kept in a condensation vessel for 30 minutes at 190° C. under a pressure of 100 mm. of mercury, in order to eliminate substantially the butanediol excess. Finally, the temperature was increased to 220° C. and the pressure was then lowered in the course of 30 minutes to 0.1–0.5 mm. of mercury. After reaching the final vacuum the polycondensation was completed at a temperature of 235° C. in the course of 170 minutes (polycondensation time).

A practically white product was obtained with a relative viscosity of 2.02, a melting point of 221° C. and a content of basic N of 120 mequiv./kg. polyester. The polyester obtained was dried for 8 hours at 160° C. under a pressure of 10 mm. of mercury and then spun at 250° C. with a draw off rate of 1000 m./min. The filaments drawn in the usual manner with a draw ratio of 1:2.4 had the following properties:

Tensitle strength _____ p./dtex__ 2.8
Elongation at break_____ percent__ 33.3
Yellow figure _____ 12.7

EXAMPLE 6

250 g. of dimethyl terephthalate, 255 g. of butanediol-1,4, 22.5 g. of N-[3,5-dicarbomethoxy]-benzyl-dibenzylamine and 111 mg. of isopropyl titanate were transesterified for 110 minutes at 150–190° C. and then condensed as described in Example 5 at 235° C. for 2 hours (polycondensation time). The almost colorless polyester had a relative viscosity of 2.19, a melting point of 218° C. and a content of basic N of 150 mequiv./kg. polyester. The filaments spun at 250° C. and drawn with a draw ratio of 1:2.4 had the following properties:

Tensile strength _____ p./dtex__ 3.1
Elongation at break _____ percent__ 40.1
Yellow figure _____ 14.1

EXAMPLE 7

250 g. of dimethyl terephthalate, 255 g. of butanediol-1,4, 15 g. of N,N-bis[(4-carbo-methoxy)-benzyl]benzylamine and 111 mg. of isopropyl titanate were transesterified for 95 minutes at 150–190° C., and polycondensed as described in Example 2 for 75 minutes at 240° C. (polycondensation time). The practically colorless polyester had a relative viscosity of 2.09, a melting point of 222° C., and a content of basic nitrogen of 127 mequiv./kg. polyester. The filaments spun at 250° C. and drawn at a draw ratio of 1:2.5 had the following properties:

Tensile strength _____ p./dtex__ 2.9
Elongation at break _____ percent__ 23.4
Yellow figure _____ 13.7

EXAMPLE 8

250 g. of dimethyl terephthalate, 255 g. of butanediol-1,4, 15 g. of N-[4-carbo-methoxy]-benzyl - dibenzylamine and 111 mg. of isopropyl-titanate were transesterified together with 1.25 g. of trimellitic acid trimethylester for 150 minutes at 150–190° C. The following polycondensation was carried out as in Example 2 at 235° C. for 4 hours (polycondensation time). The practically colorless polyester had a melting point of 223° C., a relative viscosity of 1.73 and a content of basic nitrogen of 127 mequiv./kg. of polyester. The filaments spun from the polyester at 245° C. and drawn at a draw ratio of 1:2.275 had the following properties:

Tensile strength _____ p./dtex__ 2.5
Elongation at break _____ percent__ 26.2
Yellow figure _____ 17.5

COMPARISON EXAMPLES (A) 250 g. of dimethyl terephthalate, 217 g. of ethylene glycol and 12.1 g. of N-[3,5 - dicarbo-methoxy]-benzyl-N-methyl-benzylamine were transesterified with 56 g. of manganese acetate as described in Example 1 at 180–220° C. for 4.5 hours. In order to eliminate the excess ethylene glycol the product obtained was heated at 250° C. after the addition of 25 mg. of H$_3$PO$_3$ and 76 mg. Sb$_2$O$_3$. Then the pressure was lowered in the course of 90 minutes to 0.1–0.5 mm. of mercury, whereby a completely yellow distillate was obtained. When, after obtaining the final vacuum the temperature was increased to 275° C. at strongly foaming, reaction product which was no longer capable of being stirred was obtained within 15 minutes which became increasingly darker. After a condensation time of 15 minutes the reaction had to be discontinued. The product obtained had a relative viscosity of 1.66, a second order transition temperature of 75° C., a crystallization temperature of 123° C. and a melting point of 255° C. The filaments spun at 285° C. with a draw off rate of 1000 m./min. could be drawn only with great difficulties with a draw ratio of 1:2.0. The drawn filaments had insufficient textile properties:

Tensile strength _____ p./dtex__ 1.1
Elongation at break _____ percent__ 8.8
Yellow figure _____ 58.0

(B) 250 g. of dimethyl terephthalate, 255 g. of butanediol-1,4, and 12.1 g. of N-[3,5-dicarbo-methoxy]-benzyl-N-methyl-benzylamine were transesterified with 111 mg. of isopropyl titanate similar to Example 2 at 150–190° C. in 105 minutes and subsequently condensed at 235° C. for 2 hours (polycondensation time).

An almost colorless polycondensation product was obtained with a relative viscosity of 2.08 and a melting point of 223° C., which exhibited quite a strong red color under the influence of the sun light in a short time.

(C) 250 g. of dimethyl terephthalate, 255 g. of butanediol-1,4 and 12.0 g. N-[3,5-dicarbo - methoxy]-benzyl-dicyclohexylamine were transesterified with 111 mg. isopropyl titanate as in Example 2 in the course of 2 hours at 150–190° C. and subsequently condensed for 2 hours (polycondensation time) at 235° C. A practically colorless polycondensation product with a relative viscosity of 2.14 and a melting point of 221° C. was obtained which exhibited dark pink color under the action of light in a short time just as did the polyester described in the comparison Example B.

What is claimed is:

1. A fiber- and film-forming modified linear polyester having improved colorability when dyed with acid dyes characterized by the fact that it contains chain segments of the formula

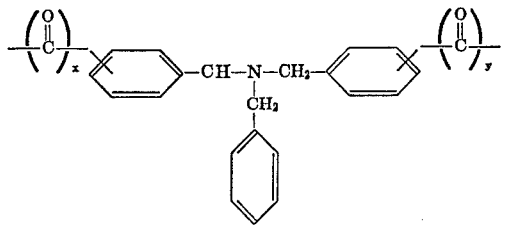

in which $x+y=1$ or 2 and $x$ and $y$ can be 0 to 2, at least 3 carbon atoms being situated between each CO-group and the $CH_2$ group which connects the ring carrying the CO-group with the tertiary N, at least 3 carbon atoms being situated between the CO-groups on the ring if $x$ or $y=2$, and the quantity of said segments in the polyester being such as to give 50 to 500 mequiv. basic nitrogen per kilogram of polyester.

2. A linear polyester according to claim 1 having from 100 to 300 mequiv. of basic nitrogen per kilogram of polyester.

3. A modified polyester according to claim 1 containing units derived from dicarboxylic acid, said dicarboxylic acid being terephthalic acid containing up to 20 mole percent of other aromatic, aliphatic or cycloaliphatic dicarboxylic acids or hydroxy carboxylic acids.

4. A modified polyester according to claim 1 containing units derived from diols of the formula $$HO(CH_2)_n-X-(CH_2)_nOH$$

in which X is $CH_2$, branched or unbranched aliphatic or cycloaliphatic alkylene, arylene, oxygen or sulfur, and $n$ is 0 to 8, except that $n$ cannot be 0 when X is $CH_2$, oxygen or sulfur.

5. Fibers and filaments made from the modified linear polyester of claim 1.

6. Fibers and filaments made from the modified linear polyester of claim 2.

References Cited
UNITED STATES PATENTS

| | | | |
|---|---|---|---|
| 2,739,958 | 3/1956 | Lincoln et al. | 260—75 |
| 3,065,207 | 11/1962 | Andres | 260—75 |

MELVIN GOLDSTEIN, Primary Examiner

U.S. Cl. X.R.

8—DIG. 4